Figure 1:
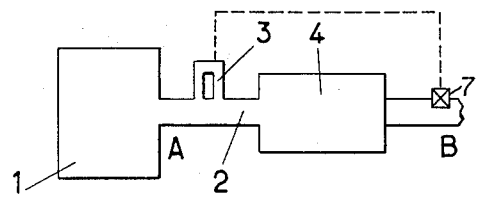

Oct. 19, 1965   R. JEAN   3,212,521

AIR-PROTECTION DEVICE

Filed April 19, 1963

INVENTOR:
Roger JEAN

BY Paul M. Craig, Jr.
ATTORNEY

United States Patent Office 3,212,521
Patented Oct. 19, 1965

3,212,521
AIR-PROTECTION DEVICE
Roger Jean, Paris, France, assignor to Compagnie Generale de Telegraphie, Sans Fil, Paris, France
Filed Apr. 19, 1963, Ser. No. 274,237
Claims priority, application France, May 3, 1962,
896,284, Patent 1,329,687
6 Claims. (Cl. 137—494)

The present invention relates to installations comprising enclosures on the inside of which one maintains a vacuum with a predetermined degree, that may be expressed by a pressure of a reduced value with respect to that of the atmosphere.

Within such enclosures are located oftentimes instruments or materials which one cannot expose to the air at atmospheric pressure without danger and risk of destruction or serious damages.

The problem of the protection against re-entries of air into enclosures under reduced pressure is encountered, for example, in pharmaceutics for the concentration of medicines, in biology for the lyophilisation of human blood, in electronics with sensitive surfaces of thermionic or photoelectric emitters, in corpuscular physics with the particle accelerators, etc.

An accidental re-entry of air entrains in these installations very important losses or a forced shut-down placing the installation out of service, which is costly due to the expenses involved in putting such installations back into operating condition and due to the time lost during immobilization of these complex and expensive installations.

To remedy these risks and dangers, one utilizes apparatus detecting very rapidly the rise in pressure, for example, by discharge gauges, and valves with pneumatic controls, electromechanic controls or with controls involving an explosion, studied and tested to obtain the rapid closure of the input paths of the gas.

Whatever the energies which are actually utilized in these systems, the closure times cannot be less than several milliseconds and the protection has real efficacity only if a space of several meters is available between the place where a re-entry of air is possible on the installation and the space where the closure of the valve permits to isolate the sensitive parts.

However, relatively long ducts or conduits present a very large number of inconveniences of physical, electrical, mechanical, financial, operational and other orders.

The present invention has for its object an installation which assures an efficient safety to the part or the parts to be protected without increasing, for that purpose, in an objectionable manner, the dimensions of the assembly.

The installation according to the present invention comprises an enclosure under reduced pressure to be protected against admissions of air, a conduit system communicating with the said enclosure, and a valve actuated to close automatically the said conduit system at the extremity thereof adjacent to the enclosure when an accidental entry of air is produced at the other extremity of the conduit system, with a predetermined closure time, and is characterized by the fact that in this conduit system is disposed an acoustical relay line delaying the passage of the air in the said conduit system by a time that is longer than the said time of closure of the valve in such a manner that the automatic closure of the valve takes place before the air can reach the enclosure to be protected.

Accordingly, it is an object of the present invention to provide a protective system for protecting an enclosure normally maintained at a pressure less than atmospheric pressure against accidental re-entries of air which avoids, by simple and effective means, the shortcomings and inadequacies encountered with the prior art.

It is another object of the present invention to provide a protective system for an enclosure maintained at a reduced pressure lower than atmospheric pressure which is simple in construction, obviates the neeed for long ducts and channels yet is extremely reliable to assure and protect sensitive materials or instruments located within the enclosure against any gases at higher or atmospheric pressures.

Still a further object of the present invention resides in the provision of a closure system operable to automatically close in good time before any increase in pressure due to the admission of air can become effective in the evacuated enclosure.

Figure 2:
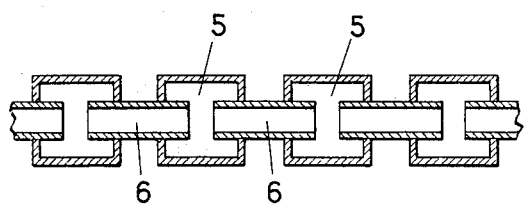
Figure 3:
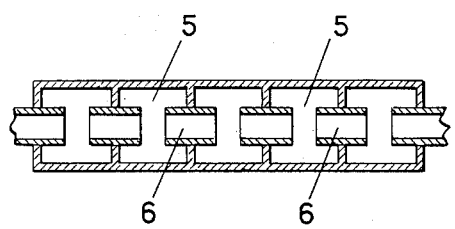
Figure 4:
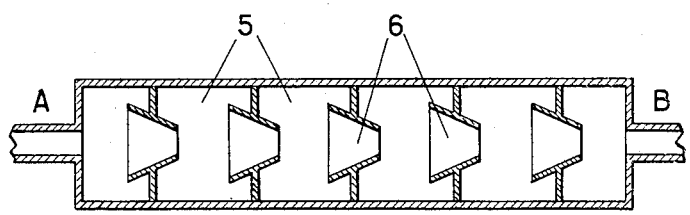

These and other objects, features and advantages of the present invention will become more obvious from the following description when taken in connection with the accompanying drawing which shows, for purposes of illustration only, several embodiments in accordance with the present invention, and wherein FIGURE 1 illustrates schematically the principle of the present invention, and FIGURES 2 to 4 show in longitudinal cross sectional view several embodiments of acoustical delay lines which may be utilized in an installation according to the present invention, it being understood that the several acoustical delay lines are shown for illustrative purposes only and are not limitative of the present invention.

Referring now to the drawing wherein like reference numerals are used throughout the various views to designate like parts, and more particularly to FIGURE 1, the several parts of an installation in accordance with the present invention are illustrated schematically in this figure comprising an enclosure 1 under reduced atmospheric pressure which one desires to protect against re-entries of air. The enclosure 1 communicates with a conduit system 2, provided at the extremity A thereof with an automatic closure valve 3 actuated by an electromechanical or other suitable device 7, of any suitable conventional construction in such a manner that any accidental entry of air at the extremity B of the conduit system produces the closure of the extremity A by the valve 3. The closure time is very short, for example, of the order of a hundredth of a second, but nevertheless sufficient to permit the air that has appeared at B to traverse the entire conduit system and to penetrate finally into the enclosure 1 if the conduit system 2 is not very long.

To permit the utilization of a short conduit system, the installation according to the present invention comprises an acoustical delay line 4, disposed along or interconnected in the conduit system 2 whereby the conduit system is divided into two portions connected with each other by the delay line 4.

The acoustical delay lines, which are well-known per se in the prior art, may, depending on the structure and number of utilized cells, furnish significant delays to the progression of any variation in pressure.

FIGURES 2 to 4 show, in longitudinal cross section, three embodiments of delay lines that may be utilized within installations according to the present invention. These structures comprise cavities 5, communicating with one another by tubulures 6. The cavities and the tubulures may have any desired form but the cylindrical form is nevertheless the most practical.

In the modified embodiment of FIGURE 4, the tubulures are flared in such a manner as to render the propagation of air more difficult in the direction B–A than in the direction A–B which contributes to the improvement of the desired protection.

It has been verified experimentally that already with three or four cells the delay lines of this type introduce into the passage of air delay of several hundredths of a second, clearly longer than the time of closure of a sturdy and relatively inexpensive valve. It follows therefrom that the closure of the valve may take place well ahead of the arrival of the air, that is, before reaching the enclosure to protected.

The protection of the enclosure under reduced pressure is thus assured in a simple and efficient manner at low cost and within a reduced space.

While I have shown and described several embodiments in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. In an installation comprising an evacuated enclosure, a normally unobstructed pipe connected at one of the extremities thereof to said enclosure, said enclosure and pipe having a reduced internal pressure, a valve positioned near said one extremity for automatically shutting said pipe within a predetermined time after actuation, and means for automatically actuating said valve upon accidental penetration of air at any pressure into said pipe at the other extremity thereof, the improvement essentially consisting in the provision of an acoustical delay line in said pipe for delaying the passage of air therethrough by a time somewhat longer than said predetermined time, thereby preventing arrival of air from said other end of the pipe into the interior of said enclosure.

2. A protective system for protecting an enclosure maintained under reduced pressure that is lower than atmospheric pressure, against re-entry of air, comprising:
enclosure means maintained at said reduced pressure, and normally unobstructed conduit means operatively connected at one end thereof with said enclosure means including a first conduit portion, a second conduit portion, acoustic delay line means operatively connecting one end of said first portion with one end of said second portion, valve means for closing said first portion, and control means operable in response to the appearance in said second conduit portion of a pressure higher than the pressure within said enclosure means and operatively connected with said valve means for automatically closing said first conduit portion near said enclosure within a predetermined time after appearance of such higher pressure in said second conduit portion, said delay line means having a delay time sufficient to delay the passage of air therethrough by a time somewhat longer than said predetermined time.

3. A protective system for protecting an enclosure maintained under reduced pressure that is lower than atmospheric pressure, against re-entry of air, comprising:
enclosure means adapted to be maintained at said reduced pressure, and normally unobstructed conduit means operatively connected at one end thereof with said enclosure means including acoustic delay line means having an input and an output, valve means between the output of said delay line means and said enclosure means, and control means responsive to subatmospheric pressure higher than said reduced pressure disposed in said conduit means on the side of the input of said delay line means, operable in response to the detection of any pressure higher than the pressure within said enclosure means and operatively connected with said valve means for automatically closing said first conduit portion near said enclosure within a predetermined time after appearance of such higher pressure in the respective conduit means, said delay line means having a delay time sufficient to delay the passage of air therethrough by a time somewhat longer than said predetermined time.

4. A protective system for protecting an enclosure maintained under reduced pressure that is lower than atmospheric pressure, against re-entry of air, comprising:
enclosure means adapted to be maintained at said reduced pressure, and normally unobstructed conduit means operatively connected at one end thereof with said enclosure means including acoustic delay line means having an input and an output, valve means between the output of said delay line means and said enclosure means, and control means responsive to subatmospheric pressure higher than said reduced pressure disposed in said conduit means on the side of the input of said delay line means, operable in response to the detection of any pressure higher than the pressure within said enclosure means and operatively connected with said valve means for automatically closing said valve means,
said acoustical delay line means having means providing a greater delay in the direction from the input to the output thereof than in the opposite direction.

5. An evacuated system including an enclosure, an acoustical delay line, a first normally unobstructed pipe connected between said enclosure and one end of said delay line, a second normally unobstructed pipe connected to the other end of said delay line, and a valve operable to automatically shut said first pipe within a predetermined time after actuation, and means responsive at least to atmospheric pressure for automatically actuating said valve upon accidental penetration of air into said second pipe, said delay line being adapted to delay the passage of air therethrough by a time somewhat longer than said predetermined time, thereby preventing arrival of air from said second pipe into the interior of said enclosure.

6. For use with a particle accelerator having a particle beam, an evacuated enclosure, an evacuated normally unobstructed pipe connected by one end thereof to said enclosure to provide an unobstructed, substantially linear path, an evacuated acoustical delay line connected by one end thereof to the other end of said pipe, valve means for shutting said pipe near said enclosure within a predetermined time after actuation, and means for automatically actuating said valve means upon accidental penetration of air at any pressure into the other end of said delay line, said delay line being capable of delaying the passage of air therethrough by a time somewhat longer than said predetermined time, thereby preventing arrival of air from said other end of the delay line into the interior of said enclosure.

References Cited by the Examiner
UNITED STATES PATENTS

| 2,670,011 | 2/54 | Bertin et al. | 138—44 |
| 2,845,946 | 8/58 | Oliveau et al. | 137—505.13 |
| 3,075,448 | 1/63 | Cohen | 137—517 XR |
| 3,132,666 | 5/64 | Nelson | 251—127 XR |

FOREIGN PATENTS

| 1,231,207 | 9/60 | France. |

M. CARY NELSON, *Primary Examiner.*

MARTIN P. SCHWADRON, *Examiner.*